United States Patent
Brown (10) Patent No.: US 10,579,466 B2
(45) Date of Patent: Mar. 3, 2020

(54) SYSTEMS AND METHODS FOR AGENTLESS ERROR MANAGEMENT

(71) Applicant: HEWLETT PACKARD ENTERPRISE DEVELOPMENT LP, Houston, TX (US)

(72) Inventor: Andrew Brown, Houston, TX (US)

(73) Assignee: HEWLETT PACKARD ENTERPRISE DEVELOPMENT LP, Houston, TX (US)

(*) Notice: Subject to any disclaimer, the term of this patent is extended or adjusted under 35 U.S.C. 154(b) by 0 days.

(21) Appl. No.: 16/050,208

(22) Filed: Jul. 31, 2018

(65) Prior Publication Data

US 2020/0042377 A1 Feb. 6, 2020

(51) Int. Cl.
*G06T 1/20* (2006.01)
*G06F 11/07* (2006.01)
*G06F 11/00* (2006.01)

(52) U.S. Cl.
CPC ........ *G06F 11/0793* (2013.01); *G06F 11/006* (2013.01); *G06F 11/0721* (2013.01); *G06T 1/20* (2013.01); *G06F 2201/82* (2013.01)

(58) Field of Classification Search
CPC .............. G06F 11/0793; G06F 11/006; G06F 11/0721; G06T 1/20
USPC ........................................................ 345/501
See application file for complete search history.

(56) References Cited

U.S. PATENT DOCUMENTS

| 8,612,807 | B2 | 12/2013 | Collins, Jr. |
| 9,459,976 | B1 | 10/2016 | Sun |
| 2006/0236165 | A1* | 10/2006 | Cepulis ............... G06F 11/1008 714/721 |
| 2012/0137180 | A1* | 5/2012 | Shao .................... G06F 11/0751 714/37 |
| 2012/0179602 | A1 | 7/2012 | Wheelock |
| 2012/0179939 | A1* | 7/2012 | Collins, Jr. ........... G07F 19/207 714/57 |

(Continued)

FOREIGN PATENT DOCUMENTS

| CN | 101184241 | * | 7/2010 |
| CN | 106294142 | * | 1/2017 |

OTHER PUBLICATIONS

Ikryanov, V.; "Web-Based Java Swing Kiosk Application," Apr. 2, 2016, https://dzone.com/articles/web-based-java-swing-kiosk-application.

(Continued)

*Primary Examiner* — Jin Ge
(74) *Attorney, Agent, or Firm* — Hewlett Packard Enterprise Patent Department (57) ABSTRACT

Systems and methods are provided for agentless error management by an agentless system. The agentless system can include a management processor and a memory that stores agentless management firmware. Execution of the firmware causes to obtain first graphic data corresponding to actual output graphics that are displayed via a display device. An error is detected in the actual output graphics. The error can indicate one or more differences between the actual output graphics and intended output graphics. The detected error can be addressed, such that it is remedied or attempted to be remedied by eliminating the differences and/or extraneous graphical content from the displayed data or actual output graphics.

18 Claims, 8 Drawing Sheets

(56) References Cited

U.S. PATENT DOCUMENTS

| | | | |
|---|---|---|---|
| 2013/0145214 A1* | 6/2013 | Provencher | G06F 11/0754 |
| | | | 714/37 |
| 2015/0058482 A1* | 2/2015 | Yu | H04L 43/045 |
| | | | 709/224 |
| 2017/0039100 A1* | 2/2017 | Mashimo | G06F 11/0706 |
| 2017/0123927 A1* | 5/2017 | Su | G06F 11/1417 |

OTHER PUBLICATIONS

Minute Key, "The Machine," retrieved online May 22, 2018, https://www.minutekey.com/.

* cited by examiner

SYSTEMS AND METHODS FOR AGENTLESS ERROR MANAGEMENT

BACKGROUND

Agentless systems are computing systems such as autonomic systems that are capable of self-management. These systems do not require traditional human monitoring or input to continuously and effectively operate and make decisions. Agentless systems can execute operating systems and applications, thereby causing graphical content to be generated and displayed at a display device. The displayed content is consumed or interacted with by users or viewers of the display device.

BRIEF DESCRIPTION OF THE DRAWINGS

Certain examples are described in the following detailed description and in reference to the drawings, in which.

DETAILED DESCRIPTION

Agentless systems are computing systems that are autonomic and can self-manage. That is, in contrast with traditional computing systems, agentless systems do not require human input or interaction to be managed or to maintain their normal functionality. The self-management capabilities of these systems reduce or eliminate the need for human interaction for monitoring purposes, making agentless systems often more inexpensive and efficient alternatives to traditional human-monitored computing systems. Agentless systems are therefore being increasingly deployed in a variety of settings to output or display information to a viewer or consumer, as well as to provide input and output capabilities that enable a user to interact with the system. For example, agentless systems are often deployed as information, promotion, directory, self-service and/or vending kiosks at a wide range of locations.

Like traditional systems, however, agentless systems can be impacted by errors and failures caused by their hardware and/or software, including their operating systems or applications deployed thereon. These errors and failures can result in extraneous or unintended graphics or data being displayed in a manner that obstructs or interferes with the system's intended graphical output. In some cases, the display of extraneous or unintended graphics can impede the functionality of the systems or render agentless systems useless even if they are otherwise functioning normally and displaying the correct or intended graphics behind the scenes. Yet, unlike traditional systems, agentless systems are sometimes unable to self-detect errors or graphical anomalies, and/or self-heal or self-correct those errors. The absence of human users monitoring and managing the systems can also contribute to the systems' shortcomings in detecting and/or addressing errors.

There is a need therefore for systems and methods that provide agentless error management. To this end, the embodiments described herein enable detection and/or remediation of errors in agentless systems. In some embodiments, the errors can cause or correspond to extraneous or unintended graphics or graphical elements being displayed instead of or in addition to the intended output graphics. The extraneous graphics or graphical elements can interfere with a user or viewer's ability to see all of the intended output graphics and/or to interact (e.g., provide inputs) with portions of the intended output graphics that are obstructed by the extraneous content. In some embodiments, the agentless management of errors, including the detection and remediation of errors, can be performed by a specific component of the agentless system, such as a management controller or baseboard management controller (BMC) that is separate and distinct from the processors and memory devices of the agentless system.

Moreover, in the embodiments described herein, the detected errors can be remedied in various ways including based on predetermined error templates and/or based on predetermined or real-time rules that take into consideration aspects, features, properties or characteristics of the actual intended output graphics and/or the extraneous graphics or graphical elements. It should be understood that the agentless management described herein, including the detection and remediation of errors can be automatically performed by a system, without requiring inputs or outputs from humans and/or other systems such as remote management systems. Nonetheless, in some embodiments, a human can interact with the agentless system during an agentless error management process.

Accordingly, in some embodiments, a management processor is provided that includes a processing core and at least one memory communicatively coupled to the processing core. The at least one memory stores management firmware. When the firmware is executed by the processing core, the management processor is caused to obtain first graphic data that corresponds to actual output graphics displayed via a connected display device at a first instance. An error is detected in the actual output graphics based on the received first graphic data. The error indicates one or more differences between the actual output graphics displayed at the first time instance and corresponding intended output graphics. The management processor is also caused to address the detected error by remedying or attempting to remedy the detected error, for instance, by eliminating one or more differences.

Moreover, in some embodiments, a system includes a system processor, a system memory, and a management controller. The system memory stores one or more applications including executable instructions. When the applications are executed by the system processor, the system processor outputs display data. The management controller includes a management processor and a management memory storing management firmware. When the firmware is executed by the management processor the management processor receives the display data caused to be output by the execution of the one or more applications stored in the system memory. Moreover, the display data is caused to be displayed via a video controller, at a connected display device. An error is detected in the displayed display data. The error indicates the presence of an extraneous graphic among the displayed display data. The detected error is addressed by executing one or more actions on the displayed display data, such that the extraneous graphic is removed from the displayed display data.

Still further, in some embodiments, a method is provided that includes executing, by a system processor, one or more applications, causing corresponding image data to be generated for display. The generated image data is caused by a management controller to be displayed at a display device. An error is detected, by the management controller, in the image data as displayed at the display device. The error indicates an extraneous graphic in the displayed image data. The extraneous graphic obstructs the visibility of the image data at the display device. Features of the extraneous graphic are identified by the management controller. One or more actions are executed by the management controller based on the identified features of the extraneous graphic. The executing of the one or more actions causes the extraneous graphic to be removed such that it does not obstruct the visibility of the image data at the display device.

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variations.

System and Computing Environment

Figure 1:
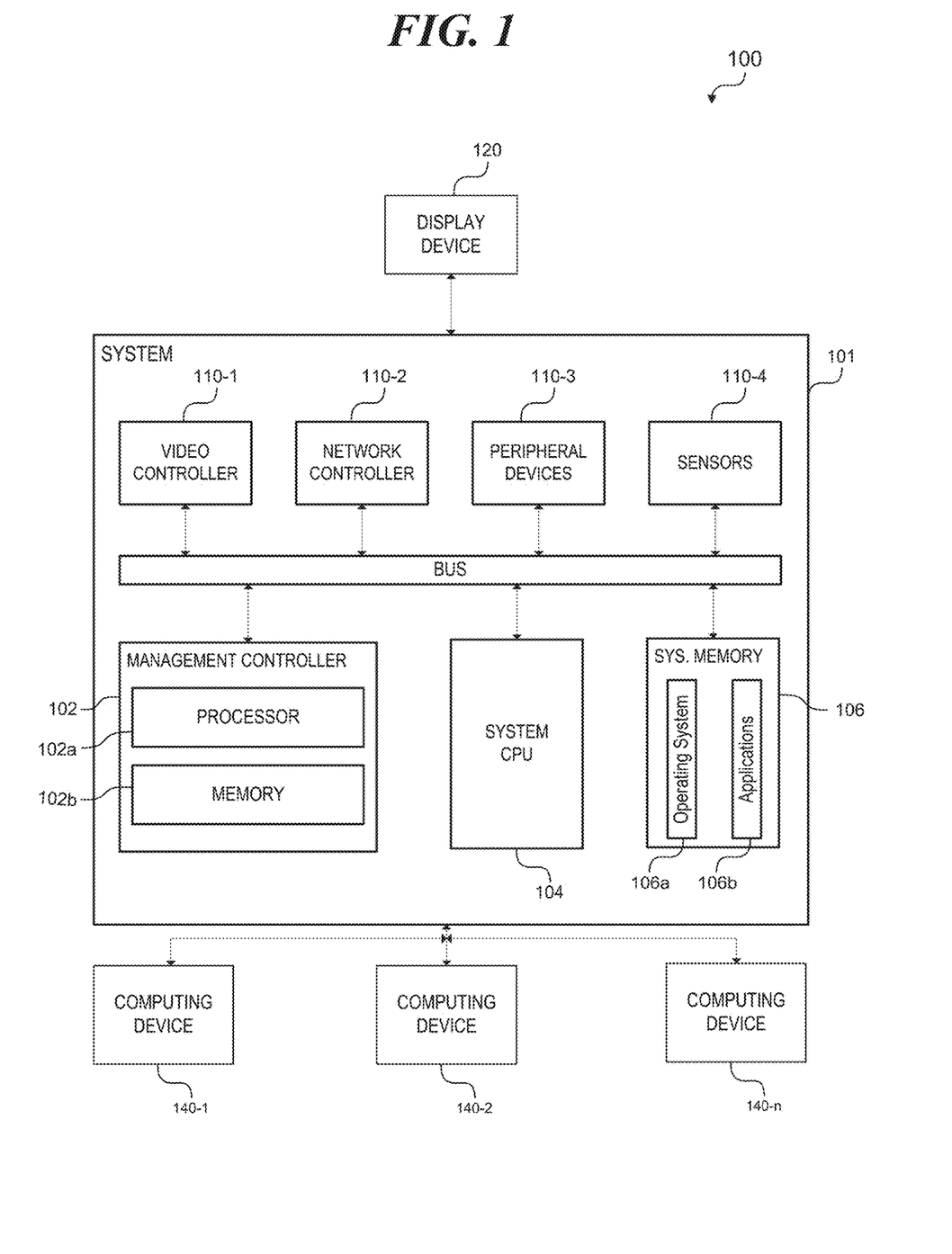
FIG. 1 is a diagram illustrating an exemplary embodiment of a computing environment for deploying computing systems and devices such as an agentless computing system.

Turning to the figures, FIG. 1 is a diagram illustrating an exemplary embodiment of a computing environment 100 for deploying computing systems and devices such as an agentless computing system. The computing environment 100 includes a system 101 which, in some embodiments, is an agentless system that is configured to manage, resolve, remedy and/or address errors such as those concerning the display and/or visibility of data, as explained in further detail herein. In some embodiments, system 101 and an associated display device (e.g., display device 120) can be or form part of a kiosk or similar agentless system. It should be understood that "agentless" refers to those systems that are designed and configured to operate without the need for a human operator being present all or a substantial portion of the time that the system is operational. Such kiosks or agentless systems can be configured to merely output information, while others are configured to be interactive such that information can be output and user commands be input using a touchscreen or the like. These kiosks or agentless systems can be deployed in a variety of settings including a city street, shopping mall or center, airport, parking lot, and others known to those of skill in the art. Non-limiting examples include a directory or information kiosk (e.g., store listing, map, flight arrival and departure information), a product promotion kiosk, a self-service kiosk (e.g., security, retail), a vending kiosk, and the like. As described in detail herein, the kiosk or agentless system is configured to execute particular code that causes information associated with the kiosk's purpose to be displayed at the display device for consumption by a display device viewer or user.

As shown in FIG. 1, the system 101 includes a management controller 102, a central processing unit (CPU) 104, memory 106. In some embodiments, the system 101 can include various other hardware including a video controller 110-1, a network controller 110-2, one or more peripheral devices 110-3, sensors 110-4 (collectively "110"), and others known to those of skill in the art. The components of the system 101, including those illustrated in FIG. 1, are connected to each other via a system bus 108 that enables communications therebetween.

It should be understood that the system 101 can include more or fewer components than those illustrated in FIG. 1. For instance, as discussed in further detail below, in some embodiments, the system 101 can be provided without peripheral devices 110-3. Moreover, in some embodiments, the components of system 101 such as those illustrated in FIG. 1 are provided within a single case or housing, and/or physically attached thereto.

As known to those of skill in the art, the video controller 110-1 of the system 101 is a hardware component configured to, among other things, generate a video signal or the like for display at a display device. In some embodiments, a video controller as used herein can refer to a video adapter, video card, graphics controller, graphics adapter, graphics card and the like. The network controller 110-2 is a hardware component configured to connect the system 101 to a computer network. The peripheral devices 110-3 are devices configured for inputting and/or outputting data to and/or from the system 101. Non-limiting examples of the peripheral devices 110-3 include input devices such as a mouse, keyboard, image scanner, reader, controller, microphone, and webcam; output devices such as a computer monitor, projector, printer, and speaker; and input/output devices such a touchscreen or a storage device (e.g., flash drive). The sensors 110-4 are devices that are configured to measure data and transmit it to other components (e.g., to the management controller 102 or CPU 104) for further processing. Non-limiting examples of sensors 110-4 include devices to measure humidity, temperature, power supply voltage, communications parameters, fan speeds, operating system functions, and the like.

Still with reference to FIG. 1, as described above, the system 101 includes a CPU 104 and a memory 106. Although not illustrated as such in FIG. 1, it should be understood that the system 101 can include multiple CPUs and multiple memory components of various types, including volatile (e.g., random access memory (RAM)) and non-volatile memory (e.g., read-only memory (ROM)). The memory 106 can store firmware and software, as well as other data received and/or generated by the system 101. As shown in FIG. 1, in some embodiments, the memory 106 can store an operating system 106*a* and applications 106*b* that are executable by the CPU 104. The operating system 106*a* and/or applications 106*b* can be configured to achieve the purpose of the kiosk. For example, in one illustrative example in which the system 101 is included in an airport flight information kiosk or station, the CPU 104 can execute the operating system 106*a* and/or applications 106*b* that include code, logic or instructions to collect flight data and arrange it in an optimal format for display (e.g., departure flights displayed in the order of their departure time and only for flights departing in the next 12 hours from a particular airport terminal). As known to those of skill in the art, various operating systems 106*a* and applications 106*b* can be used as needed for the purpose of the system 101.

In addition to the CPU 104 and the memory 106, the system 101 includes a management controller 102, such as a baseboard management controller (BMC), that can be configured to implement other or additional services or tasks for the system 101. In some embodiments, the management controller 102 is a specialized microcontroller embedded on the motherboard of a system such as the system 101. The management controller can include one or more CPUs and memory, such as the processor 102a and the memory 102b illustrated in FIG. 1. The memory 102b, which can include both volatile and non-volatile memory, can store code in the form of firmware or software. As described in further detail below, the firmware can be stored in non-volatile memory of the management controller 102 and be configured to provide services such as managing (e.g., addressing, remedying, attempting to remedy) errors associated with the system 101. Such errors can include graphical errors such as the display of extraneous or unintended data caused, for example, by the operating system 106a and/or the applications 106b. It should be understood that the management controller 102 in some embodiments is separate and distinct from the CPU 104 and the memory 106. Although not illustrated in FIG. 1, in some embodiments, the management controller 102 can include (e.g., have embedded thereon) a video controller, which can be provided in addition or alternative to the video controller 110-1 of the system 101.

Notably, the management controller 102 can provide so-called "lights-out" functionality for computing devices and systems such as the system 101. The lights-out functionality enables operations to be performed by or on the system 101 even if an operating system is not installed or not functional thereon on the system 101 and/or in its memory 106. Moreover, the management controller 102 can perform operations to detect and remedy an error without needing to interact with other systems such as a remote computing device. This, therefore, enables errors to be addressed even when network connectivity is not present. Still, further, the management controller 102 can run on auxiliary power, such that it can function even if the system 101 is not powered on in a state where the operating system is initiated in a boot sequence. Accordingly, the management controller 102 can control or perform operations on or with sub-systems of a system 101 (e.g., hardware 110) regardless, notwithstanding, or independent of the state of the CPU 104. The management controller 102 can also reboot or power cycle the system 101.

As described herein, the system 101 can be configured or deployed for a particular function such as providing (e.g., displaying) flight data or directory information. Data output by the system 101 can be displayed at the display device 120, which can be a screen, monitor, or similar device that can output or display still or moving images, graphics, video and the like. The displayed data corresponds to image or graphics data received from a video controller, processor and/or controller of the system 101. In some embodiments, the display device 120 can be an input/output device that, in addition to displaying data, can also receive inputs (e.g., from a user) such as clicks, taps, swipes, and pinch actions via a touchscreen interface or the like. The display device is connected to the system 101 via a wired or wireless connection, as known to those of skill in the art. Although illustrated in FIG. 1 as a separate component from the system 101, in some embodiments, the display device 120 can physically form part of the system 101, for example, by being embedded within the same housing. The display of data and management of errors associated with the displayed data is described in further detail below with reference to FIGS. 2-6.

Still with reference to FIG. 1, the system 101 is communicatively coupled to computing devices 140-1, 140-2, . . . , and 140-n (collectively "computing devices" and/or "140") via a wired or wireless connection, as known to those of skill in the art. In some embodiments, the system 101 and computing devices 140 can be connected to one or more networks such as a local area network ("LAN"), a virtual private network ("VPN"), the Internet, or the like, or any combination of these and other networks known to those of skill in the art. The computing devices 140 can be any of a variety of devices such as a desktop computer, laptop, workstation, mobile device, and/or server that includes a processor and memory. In some embodiments, the computing devices 140 can be used to transmit or receive data to and from the system 101. For instance, the computing devices 140 can include a device for remotely managing the system 101 through human and/or machine instructions and interactions. In some embodiments, the computing devices can include a device to which error notifications are transmitted through mechanisms such as Simple Network Management Protocol (SNMP), AlertMail and the like.

Agentless Error Management

Figure 2:
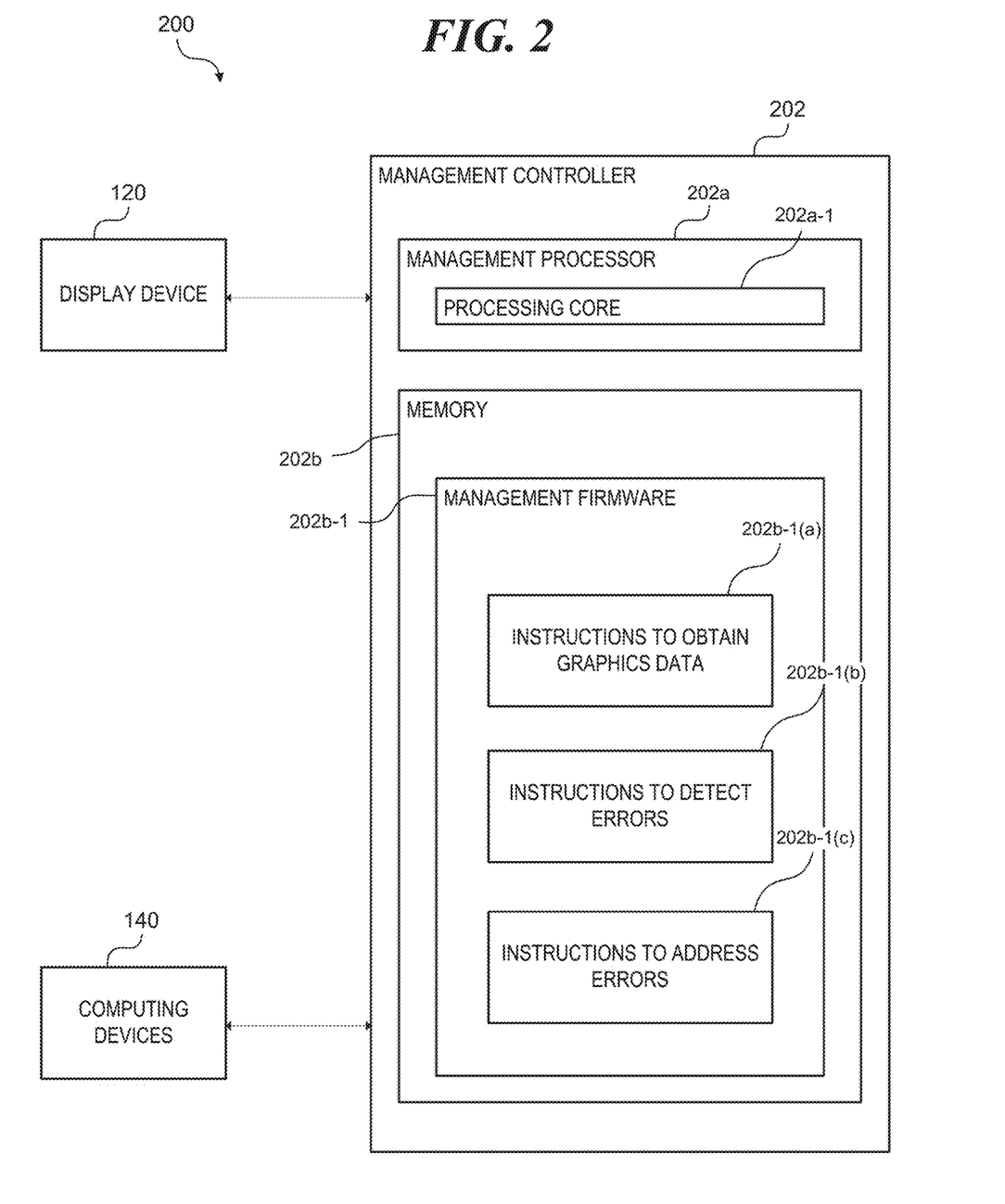
FIG. 2 is a diagram illustrating an exemplary embodiment of a computing environment in which the management controller of FIG. 1 is deployed.

FIG. 2 is a diagram illustrating an exemplary embodiment of the management controller of FIG. 1 deployed in computing environment 200. As shown, the management controller 202 is communicatively coupled to the display device 120 and to one or more computing devices 140. The management controller 202 includes a processor 202a having a processing core 202a-1, and a memory 202b, though multiple processors (or processing cores) and memory components can be included. Moreover, the memory can include volatile and/or non-volatile memory. In some embodiments, the processing core 202a-1 of the processor 202a executes instructions that cause the management controller 202 to analyze graphics data, detect errors therein, and address or attempt to address those errors.

The memory 202b can store instructions or code in the form of firmware (in non-volatile memory) 202b-1. In some embodiments, the firmware 202b-1 can be or include agentless management firmware that can automatically address detected errors without the need for human user or agent interaction. For instance, the firmware 202b-1 can include instructions to obtain graphics data (202b-1(a)), detect errors (202b-1(b)), and address the errors (202b-1(c)). The firmware 202b-1 can continuously be executed by the processing core 202a-1, or can be executed when triggered by actions such as the system 101 identifying that new or additional data is being or will be displayed at the display device 120. As described above, the firmware 202b-1 can be executed regardless of, among other things, whether the operating system and applications stored in the system memory (e.g., memory 106) and executed by the system processor (e.g., CPU 104) are functioning normally or with errors.

The instructions 202b-1(a) cause graphics data to be obtained by the management controller 202. As used herein, the graphics data refers to a signal or data (e.g., image data, video data and/or display data) such as an in-memory bitmap representing graphics, images or other information to be output or displayed (or capable of being output or displayed) via the display device 120. In some embodiments, the graphics data can be obtained continuously, at a predetermined interval (e.g., every 1 second, 5 seconds, 10 seconds, etc.), or based on triggers. Non-limiting examples of triggers include receiving, by the management controller 202, a message or notification of an error from the operating system or application; identifying, by the management controller 202, the occurrence or likely occurrence of an error caused by the operation of the operating system or application; or the detection of a certain amount or percentage of content being changed in displayed graphics data relative to the content of a preceding (e.g., immediately preceding) graphics data. Such triggers would indicate the need to obtain graphics data for analysis, as described in further detail below. The graphics data is obtained from the video, which is configured to transmit the data to the display device 120 for display, and/or from a memory associated with the video controller such as a framebuffer, screen buffer, video buffer and the like. In some embodiments, the graphics data can include color values for every pixel to be shown on the display device 120, as needed to represent the desired images, graphics, content or other information.

The instructions 202b-1(b) cause the management controller 202, using the processor 202a or processing core 202a-1, to detect errors in or associated with the obtained graphics data. In some embodiments, an error corresponds to, indicates or represents one or more differences between intended output graphics and the actual output graphics. As used herein, the intended output graphics refer to the data, graphics and/or graphical elements that were intended to be displayed by the display device 120 at a given time instance. In other words, the intended output graphics refer to the data, graphics and/or graphical elements that that the system 101 is designed or configured to output (e.g., flight arrival and departure details for a flight information kiosk) or the data, graphics and/or graphical elements that a particular application (e.g., flight data generator) generated and output for display. On the other hand, as used herein, the actual output graphics refers to the data, graphics and/or graphical elements that were in fact output or displayed by the display device 120 in association with or corresponding to the intended output graphics.

As described above, a detected error can indicate the presence of one or more differences, anomalies, or extraneous graphics between the intended output graphics and the actual output graphics. That is, an error can indicate the presence of an additional graphic and/or graphical elements in the actual output graphics. It should be understood that the error can indicate any type of difference or graphical difference between the intended output graphics and the actual output graphics. In some embodiments, the difference indicated by the error can be or indicate the presence or display of one or more graphical elements such as a dialog box, prompt and/or combination thereof.

Still with reference to the instructions 202b-1(b), in some embodiments, detecting errors can be performed by comparing a snapshot of the actual output graphics displayed on the display device 120 with the intended output graphics and/or with historical output graphics data. Such a comparison highlights any differences therebetween. Additionally or alternatively, detecting errors can be performed by analyzing the graphics data to identify graphics elements that typically correspond or conform to known or apparent errors (or error dialogs) such as operating system errors. In some embodiments, the memory 202b can store error data in the form of error templates that indicate or define known errors or error types. As described in further detail below, each error template can also include information indicating how to repair or remedy the corresponding error or error type. The error templates can be referenced by the management controller 202 when attempting to detect errors. For instance, the instructions 202b-1(b), when executed, can cause the management controller 202 to recognize a graphical element or area of the display as a known or apparent error based on the graphical properties of the graphical element or area matching or substantially resembling an error template. Non-limiting examples of such graphical properties can include color, shape, size, border, font and the like. Based on the analysis of graphical properties, the management controller 202 can determine or identify, for example, the presence of a rectangular area having a color and border that matches or resembles a particular error dialog.

Moreover, in some embodiments, an error can be identified by the presence of an area or graphical element having a color that is substantially different from the color of the graphics in the intended graphics. Still further, in some embodiments, the instructions 202b-1(b) can cause the management controller (and/or the processor 202a, processing core 202a-1) to detect text (e.g., using optical character recognition (OCR)) or control elements (e.g., buttons) that correspond to or indicate an error, based on their message, position, size and the like. This information is used to determine whether errors are indeed present in the actual output graphics displayed by the display device 120.

In turn, the instructions 202b-1(c) cause the management controller 202 to address detected errors. It should be understood that addressing an error can include remedying and attempting to remedy the detected error by eliminating or attempting to eliminate the one or more differences identified between the intended and actual output graphics. In some embodiments, addressing the error includes causing the output graphics to be displayed at the display device 120 as intended, such that the intended output graphics can be viewed without obstructions.

In some embodiments, addressing a detected error includes executing one or more actions by the processor 202a (or processor core 202a-1). These actions can be instructions that typically correspond or are triggered by inputs from peripheral or input/output devices such as a keyboard or mouse. Although the system 101 can include or be associated with peripheral or input/output devices, in some embodiments, the actions caused to be performed by the instructions 202b-(c) to address errors can simulate inputs from other devices. As used herein, the terms "simulate," "simulate inputs" and the like refer to a processor (e.g., processor 202a) executing actions or instructions that exhibit or cause the behavior of the input or process being simulated. In some embodiments, the inputs or processes being simulated are traditionally initiated by and/or performed via a peripheral or input/output device (e.g., mouse, keyboard) but, here, when simulated, those same inputs or processes are initiated by and/or performed by the processor irrespective of any peripheral or input/output device. For instance, the processor 202a can simulate an action such as a keyboard click of the ESC button without a keyboard being connected to the system 101 or, if a keyboard is indeed connected, without the keyboard actually receiving such an input, by executing a process or instructions corresponding to an ESC button keyboard click.

The actions performed by the processor 202a to address the error can be selected based on information identified during the detection of the error or derived therefrom. For example, the actions can be based on the number of buttons and text of a dialog corresponding to the detected error, or on information included in an error template corresponding to the identified error or error type. Based on this information, the processor 202a identifies optimal or preferred actions based on rules identified at run time during the error management process, or identified from stored error templates that each include remedial actions for each error or error type. Illustrative examples of such rules include:

RULE 1: If no buttons are detected in an error dialog, (1) simulate a mouse move and click on the X command of the dialog; or (2) simulate a keyboard entry of the ESC key.

RULE 2: If 1 button is detected in an error dialog, (1) simulate a mouse move and click on the single detected button; (2) simulate a mouse move and click on the X command of the dialog; or (3) simulate a keyboard entry of the ESC key.

RULE 3: If 2 or more buttons are detected in an error dialog, (1) simulate a mouse move and click on the "correct" button from among the 2 or more buttons; (2) simulate a mouse move and click on the X command of the dialog; or (3) simulate a keyboard entry of the ESC key.

RULE 3.1: Identify the "correct" button as (1) the right-most button on the dialog; (2) the button resulting from an advanced inspection of the buttons and/or dialog (e.g., Prefer OK button or CANCEL button over RETRY button); and (3) the button resulting from the guidance of a template.

Addressing errors and applying rules to address errors to specific output graphics is described below in further detail with reference to FIGS. 5A to 5#.

In some embodiments, the result of executing the instructions 202b-1(c) to address errors is the presence of output graphics that are free of the identified extraneous graphics, such that the intended graphics are viewable at the display device 120 without obstruction. Although not illustrated in FIG. 2, in some embodiments, the management controller 202 can take subsequent actions such as verifying that the actual output graphics match or substantially match the intended output graphics. It should be understood that, the process can be repeated (e.g., instructions 202b-1(a), 202b-1(b) and 202b-1(c)) can be re-executed by the processor 202a if it is determined that the errors were not properly addressed.

Figure 3:
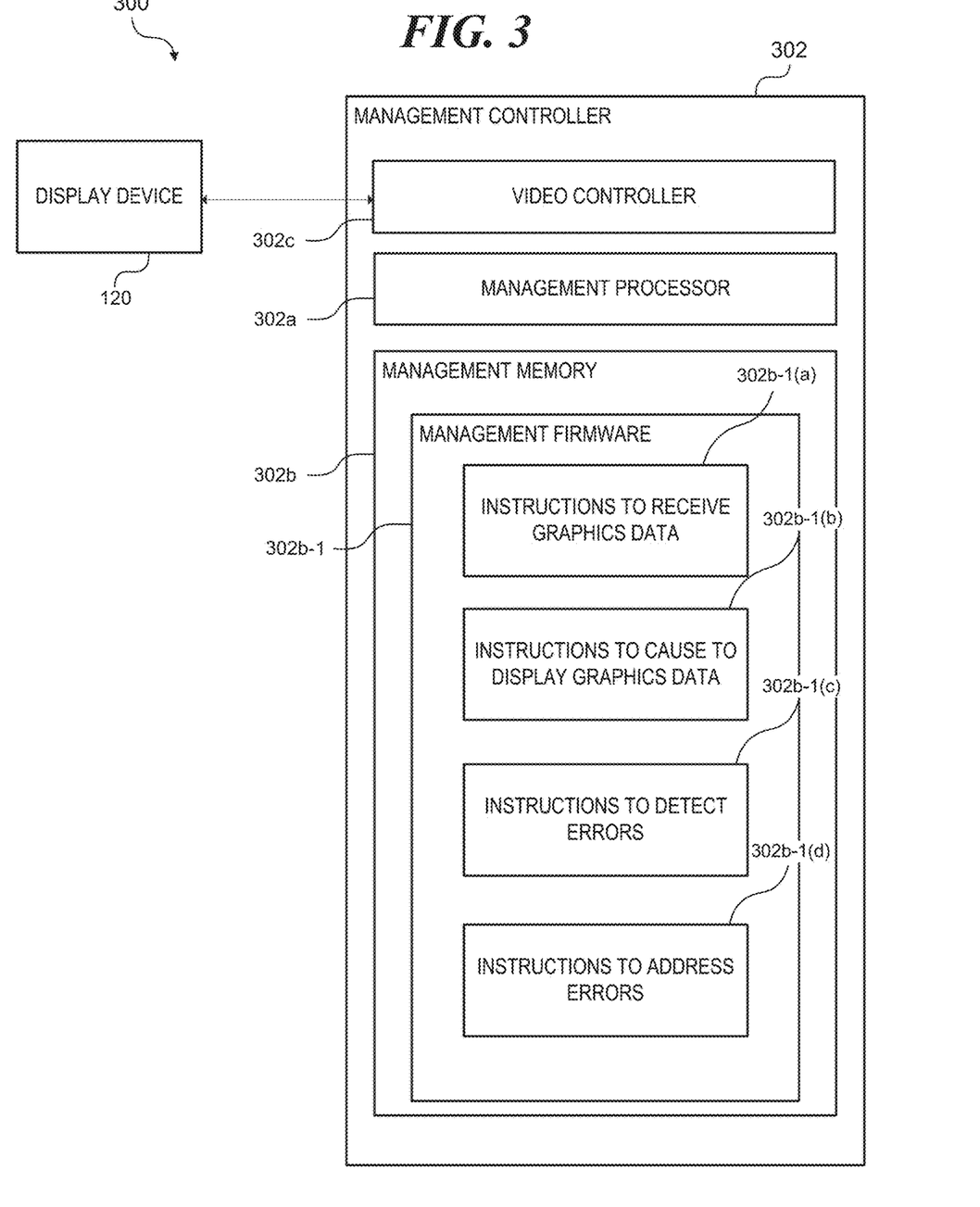
FIG. 3 is a diagram illustrating another exemplary embodiment of a computing environment in which the management controller of FIG. 1 is deployed.

FIG. 3 is a diagram illustrating an exemplary embodiment of the management controller of FIG. 1 deployed in computing environment 300. As shown, the management controller 302 is communicatively coupled to the display device 120. The management controller 302 includes a processor 302a, a memory 302b, and a video controller 302c, though it should be understood that multiple processors and memory components can be included. The memory can include volatile and/or non-volatile memory. In some embodiments, the processor 302a executes instructions that cause the management controller 302 to analyze received graphics data, cause the graphics data to be displayed, detect errors in the displayed data, and address or attempt to address those errors.

The memory 302b can store instructions or code in the form of firmware (in non-volatile memory) 302b-1. In some embodiments, the firmware 302b-1 can be firmware that can automatically address detected errors without the need for user or agent interaction. For instance, the firmware 302b-1 can include instructions to receive graphics data (302b-1(a)), cause to display graphics data (302b-1(b)), detect errors in the displayed graphics data (302b-1(c)), and address the detected errors (302b-1(d)). As described above, the firmware 302b-1 can be executed regardless of, among other things, whether the operating system and applications stored in the system memory (e.g., memory 106) and executed by the system processor (e.g., CPU 104) are functioning normally and/or with errors.

The instructions 302b-1(a) cause graphics data to be received by the management controller 302. The graphics data can be received continuously, at predetermined intervals, or based on triggers or rules. As shown in FIG. 3, the management controller 302 includes the video controller 302c, which is communicatively coupled to the display device and which is configured to generate and output the graphics data or signal to the display device 120. Accordingly, data that is generated and/or output by the CPU of the system 101 is transmitted to the video controller 302c of the management controller 302 to be processed for display.

The management controller 302 can include graphics memory (e.g., as part of the memory 302b) such as a frame or video buffer that is configured to store the graphics data representing the graphics or other content to be displayed on the display device 120. The graphics data stored in the graphics memory can be pixel data including the color value of each pixel to be displayed on the display device. Accordingly, once converted to graphics data (and, optionally, stored), the processor 302a executes instructions to cause the graphics data to be sent to the display device 120, via the video controller 302c, with instructions to display (302b-1(b)), thereby causing the graphics data to be viewable on the display device.

In turn, the processor 302a executes instructions to detect errors 302b-1(c)) by analyzing the graphics data. The graphics data can be retrieved from the video memory or frame buffer corresponding to the video controller 302c, such that the processor 302a can analyze the actual graphics data that is displayed at the display device rather than the intended graphics data. As described above, an error corresponds to, indicates or represents one or more differences between intended output graphics and the actual output graphics. That is, the error indicates the presence of extraneous or unintended graphics in the actual output graphics data, which are differences relative to the intended output graphics. In some embodiments, the extraneous or unintended graphics corresponding to the detected error can one or more graphical elements such as a dialog box, prompt and/or combination thereof.

Detecting errors can be performed by comparing a snapshot of the actual output graphics displayed on the display device 120 with the intended output graphics and/or with historical output graphics data. Such a comparison highlights any differences therebetween. Additionally or alternatively, detecting errors can be performed by analyzing the graphics data to identify graphics elements that typically correspond or conform to known or apparent errors (or error dialogs) such as operating system errors. In some embodiments, the memory 302b can store error data in the form of error templates that indicate or define known errors or error types. As described in further detail below, each error template can also include information indicating how to repair or remedy the corresponding error or error type. The error templates can be referenced by the management controller 302 when attempting to detect errors. For instance, the instructions 302b-1(c), when executed, can cause the management controller 202 to recognize a graphical element or area of the display as a known or apparent error based on the graphical properties of the graphical element or area matching or substantially resembling an error template. Non-limiting examples of such graphical properties can include color, shape, size, border, font and the like. Based on the analysis of graphical properties, the management controller 302 can determine or identify, for example, the presence of a rectangular area having a color and border that matches or resembles a particular error dialog.

Moreover, in some embodiments, an error can be identified by the presence of an area or graphical element having a color that is substantially different from the color of the graphics in the intended graphics. Still further, in some embodiments, the instructions 302b-1(c) can cause the management controller (and/or the processor 302a) to detect text (e.g., using optical character recognition (OCR)) or control elements (e.g., buttons) that correspond to or indicate an error, based on their message, position, size and the like. This information is used to determine whether errors are indeed present in the actual output graphics displayed by the display device 120.

In turn, the instructions 302b-1(d) cause the management controller 302 to address detected errors. It should be understood that addressing an error can include remedying and attempting to remedy the detected error by eliminating or attempting to eliminate the one or more differences identified between the intended and actual output graphics. In some embodiments, addressing the error includes causing the output graphics to be displayed at the display device 320 as intended, such that the intended output graphics can be viewed without obstructions.

In some embodiments, addressing a detected error includes executing one or more actions by the processor 302a. These actions can be instructions that typically correspond or are triggered by inputs from peripheral or input/output devices such as a keyboard or mouse. Although the system 101 can include or be associated with peripheral or input/output devices, in some embodiments, the actions caused to be performed by the instructions 302b-1(d) to address errors can simulate inputs from other devices. For instance, the processor 302a can execute an action such as a keyboard click of the ESC button without a keyboard being connected to the system 101 or, if a keyboard is indeed connected, without the keyboard actually receiving such an input.

The actions performed by the processor 302a to address the error can be selected based on information identified during the detection of the error or derived therefrom. For example, the actions can be based on the number of buttons and text of a dialog corresponding to the detected error, or on information included in an error template corresponding to the identified error or error type. Based on this information, the processor 302a identifies optimal or preferred actions based on rules identified at run time during the error management process, or identified from stored error templates that each include remedial actions for each error or error type. Illustrative examples of such rules are described above with reference to FIG. 2.

Figure 4:
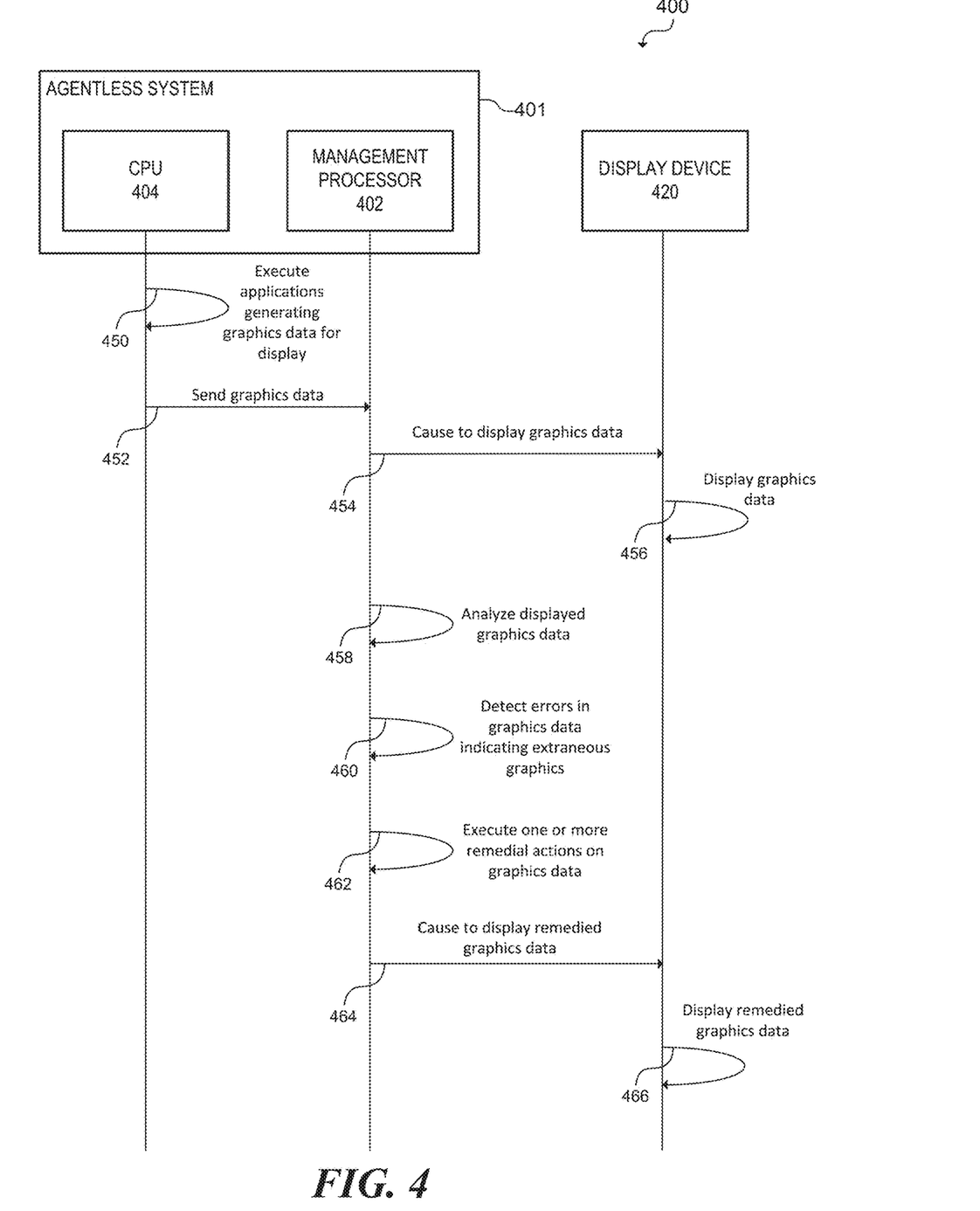
FIG. 4 is a sequence diagram illustrating an exemplary embodiment of a method for agentless error management.

FIG. 4 is a sequence diagram illustrating an exemplary embodiment of a method 400 for agentless error management. As shown, an agentless system 401 includes a CPU 404 (e.g., system processor) and a management processor 402 that is separate from the CPU 404. The management processor is configured to manage errors displayed at the display device 420.

At step 450, the CPU 404 executes one or more of an operating system and applications in accordance with the required or intended functionality of the agentless system 401. The operating system and applications can be stored in memory associated with the system 401. It should be understood that, in some embodiments, all or a portion of the operating system and/or applications can be stored in a remote memory that is communicatively coupled to the system 401. The execution of the operating system and/or applications by the CPU 404 causes graphics data or content to be generated for display.

The generated graphics data or content is transmitted by the CPU 404 to the management processor 402, at step 452.

In some embodiments, a video controller is included in the management processor 402 such that the management processor can handle the conversion of the graphics data into on-memory representations of that graphics content. At step 454, the management processor 402, via the video controller, causes the graphics data to be displayed at the display device 420. And, in turn, at step 456, the display device 420 displays the graphics data.

Once the graphics data is displayed at the display device 420, the management processor 402 analyzes the displayed graphics data at step 458, which can include examining areas, elements and/or pixels, and properties thereof to identify areas or graphical elements of the displayed graphical data that are known or appear to be associated with errors. In some embodiments, the analysis of step 458 is configured to identify errors in the displayed graphics data, such as errors that cause extraneous or unintended graphics to be displayed. As described above, an analysis to detect errors can include comparing (1) the content (e.g., graphics) generated and/or output by the operating system or applications of the system 401 for display, to or with (2) the content (e.g., graphics) represented by the graphics data displayed by the displayed device 420 and/or stored in the memory of the video controller, to identify differences therebetween.

In some embodiments, as described herein, the analysis of step 458 can include additionally or alternatively comparing (1) the content (e.g., graphics) represented by the graphics data displayed by the display device 420 and/or stored in the memory of the video controller (sometimes referred to herein as "actual output graphics"), to or with (2) graphics or graphics error data stored by the management processor 402 (or its corresponding memory) in the form of, for example, error templates. Such error templates can include graphics data corresponding to known errors or error types, or to characteristics of known errors or error types that can indicate an anticipated error or the likelihood of an error.

In some embodiments, the graphics data that is displayed by the display device at step 456 can be a continuous sequence of graphics representing a video, moving image, or the like. Accordingly, the analysis of step 458 can be performed relative to a given time instance (a first time instance) or period in time. For example, the graphics data analyzed at step 458 can correspond to graphics content associated with a first time instance of an image sequence. Accordingly, in such cases, the analysis can be performed by comparing the displayed graphics data that is actually output by the display device to intended graphics data that correspond to the first time instance. That is, the intended graphics data which is used for the comparison is selected specifically for the time instance with which the actual output graphics is to be compared at step 458.

Based on the analysis of step 458, the management processor 402 detects an error in the graphical data at step 460. The detected error indicates the presence of an extraneous or unintended graphic in the graphic data actual output or displayed on the display device 420. In some embodiments, the detected error can be one that corresponds to a known error, such as a previously identified error for which data can be stored in the form of an error template. In some embodiments, the detected error can be an anticipated error that, although not corresponding to a known error, is determined to likely be an error based on the characteristics, features or properties of graphical elements or areas of the graphical data that is displayed. For example, the management processor can detect or determine, at step 460, that the rectangular graphical element having a color substantially different than its immediately surrounding pixels (e.g., background) is an error dialog. Detecting graphical differences between two sets of graphics, or detecting certain graphics, graphical properties or elements in graphics data can be performed using various techniques known to those of skill in the art. For example, the management processor 402 can employ or execute image classification, detection or recognition algorithms that use trained machine learning models (e.g., using historical agentless system graphic data, error data and the like); and/or software or applications that perform image classification and the like using, for example, deep learning and neural networks At step 462, the management processor 402 performs or executes one or more remedial actions on or in connection with the graphical data that is actually displayed, to address or attempt to address an error detected therein. As described herein, an error can indicate one or more differences between actually displayed data and intended display data. Such differences can be the presence in the actually displayed data of a graphic or graphical element (e.g., error dialog) that is determined to be extraneous or unintended. The remedial actions are determined and performed at step 462 by the management processor 402. In some embodiments, the remedial actions are determined based on the error or error type detected at step 460, and/or based on characteristics, features or properties thereof. For example, as described above, if an error is detected as a result of the display of an error dialog containing a single button, a particular action or actions are performed for that type of error or error dialog. In some embodiments, the remedial actions are selected based on information (e.g., guidelines) included in corresponding error templates.

The one or more actions performed by the management processor 402 at step 462 can include any type of action known to those of skill in the art that is intended to remedy or attempt to remedy the detected error. As described herein, in some embodiments, the actions can be simulations of inputs traditionally obtained via a peripheral or input/output device such as a mouse or keyboard. For instance, such traditional inputs can be mouse clicks or key strokes on a keyboard. The management processor 402 is configured to simulate these inputs by executing respective instructions without the need for a user to perform the input action at a peripheral or input/output device, or even without the need for the agentless system 401 to have peripheral or input/output devices connected thereto or therewith.

It should be understood that the remedial actions executed at step 462 are intended to address or attempt to address in whole or in part the error detected at step 460. Thus, in some cases, executing the one or more remedial actions may cause the graphics data to be remedied by eliminating or removing graphical differences or extraneous graphics from the graphical data such that, when displayed by the display device 420, the content corresponding to the graphics data is displayed as intended and without display obstructions caused by the error.

In some embodiments, the execution of remedial actions at step 462 can be performed multiple times until the most optimal actions are performed. For example, the management processor 402 can execute a loop in which one or more actions are performed, their impacts on the graphics data and/or error is determined, and if the error is not adequately or optimally addressed, other actions can be identified and executed at step 462. Such a loop can iterate until the errors are addressed and/or until all actions that potentially remedy the error have been executed.

In turn, at step 464, the remedied data is caused by the management processor 402 to be displayed at the display device 420. That is, the management processor 402 can transmit the remedied data to a video controller to generate corresponding graphics data or a graphics signal, which can be stored in a graphics memory and/or transmitted to the display device 420. In some embodiments, the remedied graphics data can include the intended graphics data (e.g., corresponding to the data generated at step 450) without the graphics or graphic elements corresponding to the detected error. Although, in some cases, the remedied graphics data can still include the graphics or graphics elements caused by the detected error, for example, if the one or more actions executed at step 462 do not address the error.

At step 466, the display device 420 displays or outputs the remedied graphic data received from the management processor 402. As described above, the data displayed at step 466 can be remedied such that it does not include graphics or graphic elements (e.g., error dialog) corresponding or indicating an error.

It should be understood that all or portions of the method 400 can be performed continuously as data is received and display or at predetermined intervals of sufficiently short time, such that the analysis, error detection, remediation and display of remediated data can be performed in real-time or substantially in real-time.

Although not illustrated in FIG. 4, the management processor 402 can identify from executing an iteration of the method 400 graphical data or error information that can later be used to manage errors automatically. For instance, the management processor 402 can store data associated with a graphical component such as an error dialog not previously encountered by the management processor 402. Such information can be stored in a memory associated with the management processor 402, for instance, in the form of error templates.

FIGS. 5A to 5D illustrate displays 500A, 500B, 500C and 500D, respectively, of graphical data that includes graphics or graphical elements caused by an error. That is, the displays 500A to 500D are displays that are output via a display device (e.g., FIG. 1, display device 120), and that include graphical differences that are extraneous or unintended relative to intended graphics data. As described herein, these displays and errors can be generated or caused by failures, corruptions, exceptions, etc. occurring outside within an agentless system (e.g., FIG. 1, system 101) but outside of or not associated with the management controller (e.g., FIG. 1, management controller 102) of the agentless system. For instance, the errors can be caused by the system CPU (e.g., FIG. 1, CPU 104), and/or by the operating system or applications (e.g., FIG. 1, operating system 106*a*, applications 106*b*) stored on the system memory (e.g., FIG. 1, memory 106) and executed by the CPU.

Figure 5A:
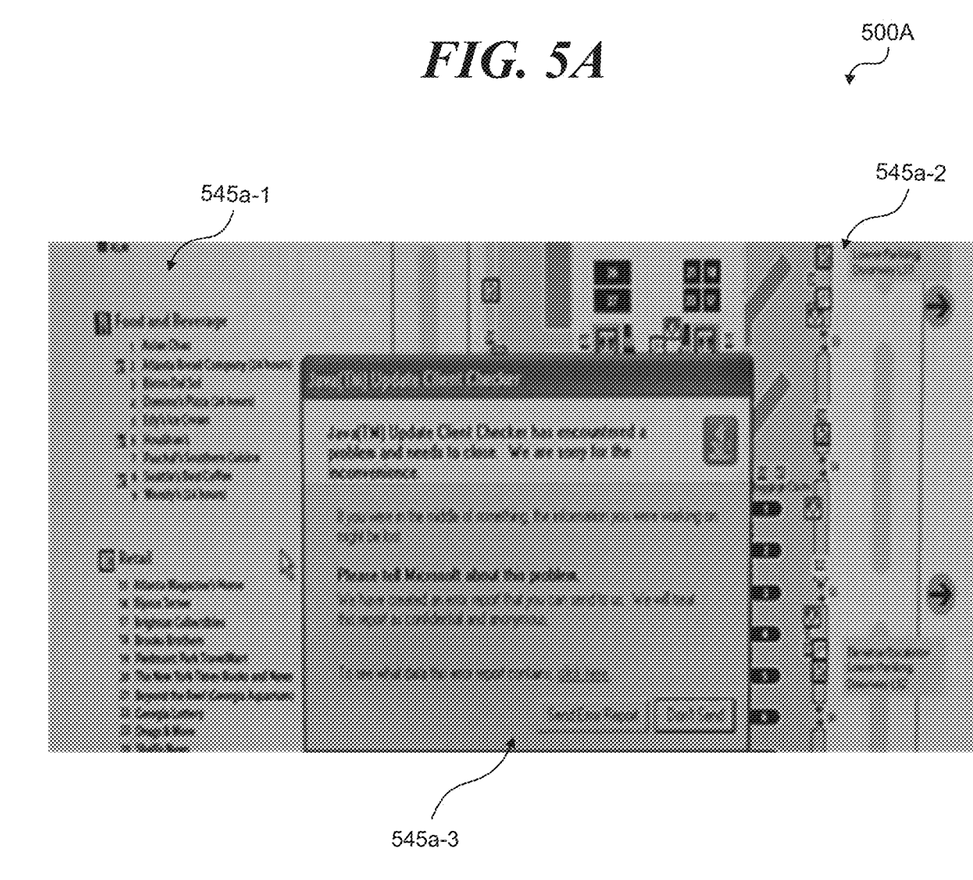
FIG. 5A is a display illustrating an exemplary embodiment of graphical data that includes graphics or graphical elements caused by an error.

FIG. 5A illustrates graphics data output by an agentless system deployed at a shopping mall and configured to provide directory information and a map relating to the shopping mall. The display 500A therefore shows or includes the actual output graphics or graphic data that are indeed displayed by the display device of the agentless management system. It should be understood that the display 500A shows the graphics and information as output and viewable by a user. As shown in FIG. 5A, the actual output graphics include list type graphical elements (e.g., food and beverage, retail) 545*a*-1 and a map type graphical element 545*a*-2. The graphical elements 545*a*-1 and 545*a*-2 are part of or form the intended graphic data that is generated by an operating system and/or applications of the agentless system that are configured to display mall information. When properly functioning, the graphical elements 545a-1 and 545a-2 are intended to be displayed via the display device without any obstructions, such that they can be fully viewed and consumed by a user.

Nonetheless, as can be seen in FIG. 5A, an error dialog graphical element 545a-3 is displayed in the display 500A. The error dialog 545a-3 is a window that is displayed above or in front of the graphical elements 545a-1 and 545a-2, which are intended to be displayed. The error dialog therefore obstructs the view of the graphics or graphical elements intended to be displayed, namely 545a-1 and 545a-2. As discussed above, the error dialog can be identified in various ways. For example, the actually displayed graphical data can be compared to the intended graphical data, to determine that the error dialog 545a-3 is a graphic or graphical element that is different, extraneous and not intended to be displayed. In some embodiments, the error dialog can be identified by analyzing the graphics (e.g., pixels) and related properties of the actually displayed data to locate graphical components that are known to be or appear to be an error. For example, the error dialog 545a-3 can be identified by recognizing the presence of one or more properties such as its rectangular shape, defined border, color different than its surroundings, buttons, and text (e.g., "Error," "problem").

Once identified, the error dialog 545a-3 can be addressed by performing one or more actions as described in further detail herein. For example, in some embodiments, remedying the error indicated by the error dialog 545a-3 can be accomplished by simulating a mouse click on one of the two buttons based on rules that consider the text of each button, the location of each button, and the like.

Figure 5B:
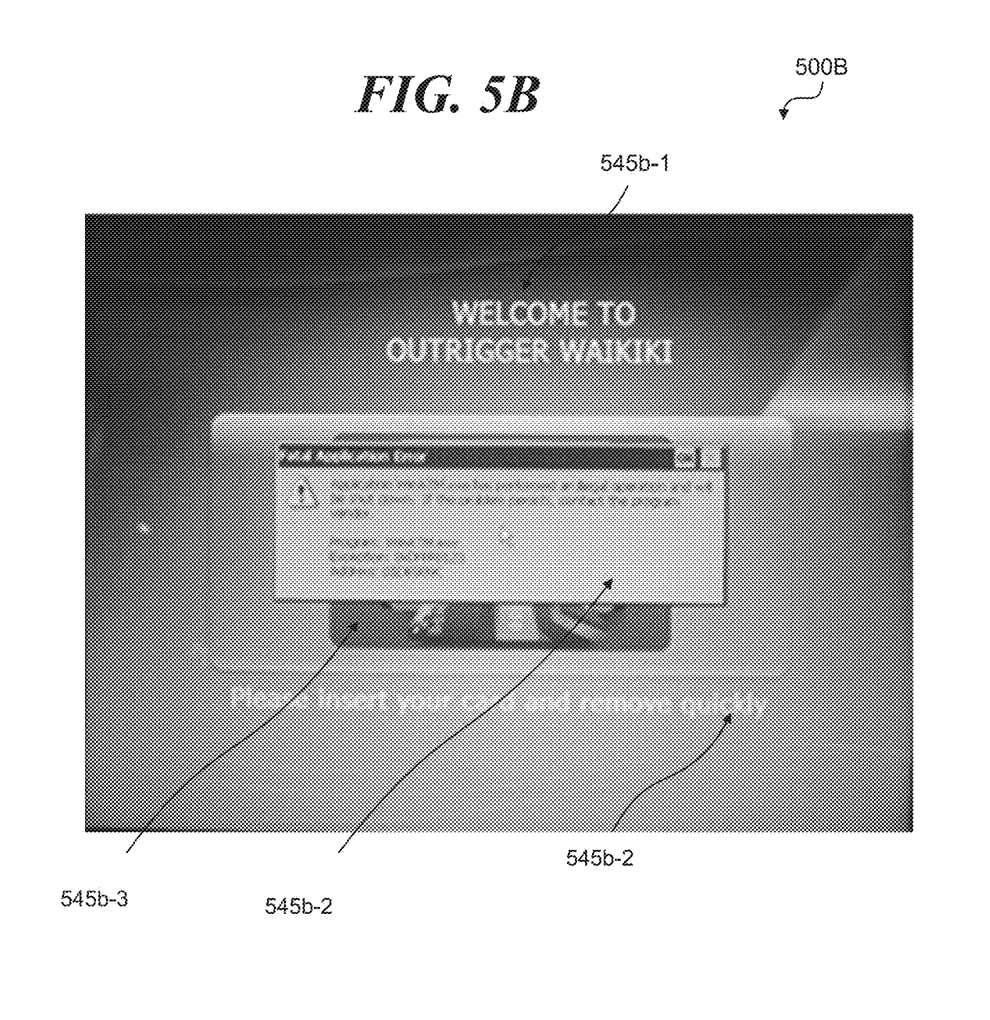
FIG. 5B is a display illustrating another exemplary embodiment of graphical data that includes graphics or graphical elements caused by an error.

FIG. 5B illustrates graphics data output by an agentless system deployed at a hotel or the like to provide hospitality services (e.g., check in, check out, etc.). The display 500B therefore shows or includes the actual output graphics or graphic data that are displayed at the display device of the agentless management system. It should be understood that the display 500B shows the graphics and information as output and viewable by a user. As shown in FIG. 5B, the actual output graphics include text box graphical elements including "Welcome to Outrigger" and "Please insert your card and remove quickly") 545b-1 and 545b-2, respectively. The actual output graphics also include a credit card insertion graphic or graphical element 545b-3. The graphical elements 545b-1, 545b-2, and 545b-3 are part of or form the intended graphic data that is generated by an operating system and/or applications of the agentless system that are configured to display mall information. When properly functioning, the graphical elements 545b-1, 545b-2, and 545b-3 are intended to be displayed via the display device without any obstructions, such that they can be fully viewed and consumed by a user.

Nonetheless, as can be seen in FIG. 5B, an error dialog graphical element 545b-4 is displayed in the display 500B. The error dialog 545b-4 is a window that is displayed above or in front of the graphical elements 545b-1, 545b-2 and 545b-3, which are intended to be displayed. The error dialog therefore obstructs the view of the graphics or graphical elements intended to be displayed. As discussed above, the error dialog can be identified in various ways. For example, the error dialog 545b-4 can be identified by recognizing the presence of one or more properties such as its rectangular shape, defined border, color different than its surroundings, and text (e.g., "error," "illegal operation," "exception").

Once identified, the error dialog 545b-4 can be addressed by performing one or more actions as described in further detail herein. For example, in some embodiments, remedying the error indicated by the error dialog 545b-4 can be accomplished by simulating a mouse click on a button or region of the error dialog.

Figure 5C:
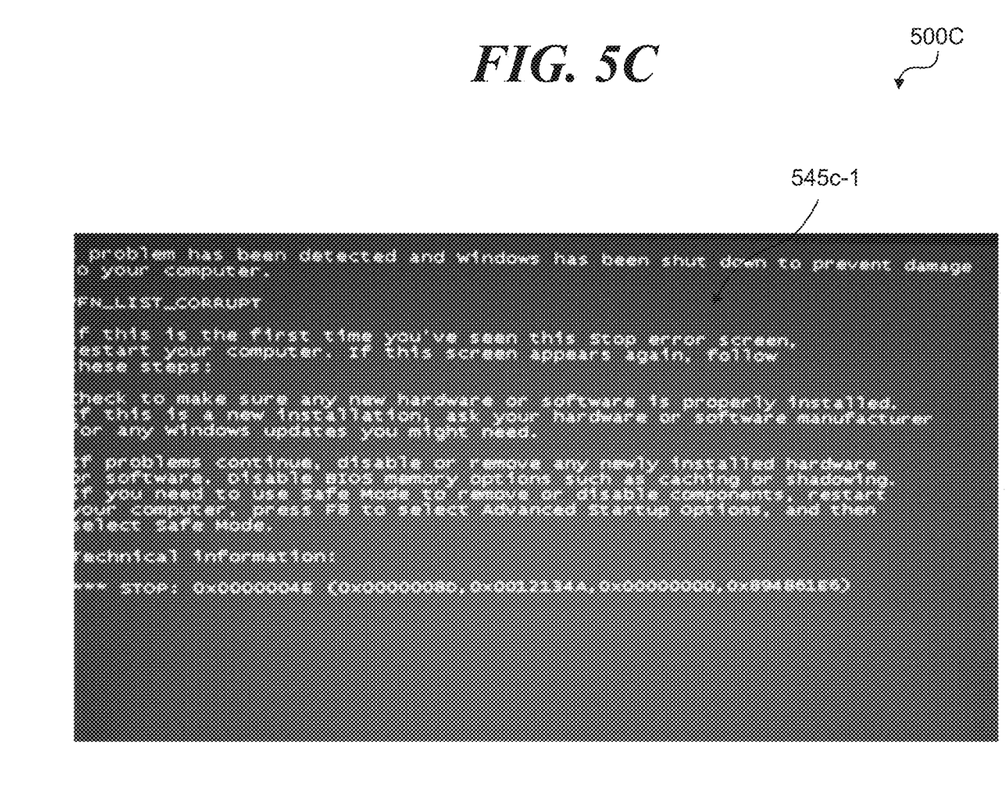
FIG. 5C is a display illustrating another exemplary embodiment of graphical data that includes graphics or graphical elements caused by an error.
Figure 5D:
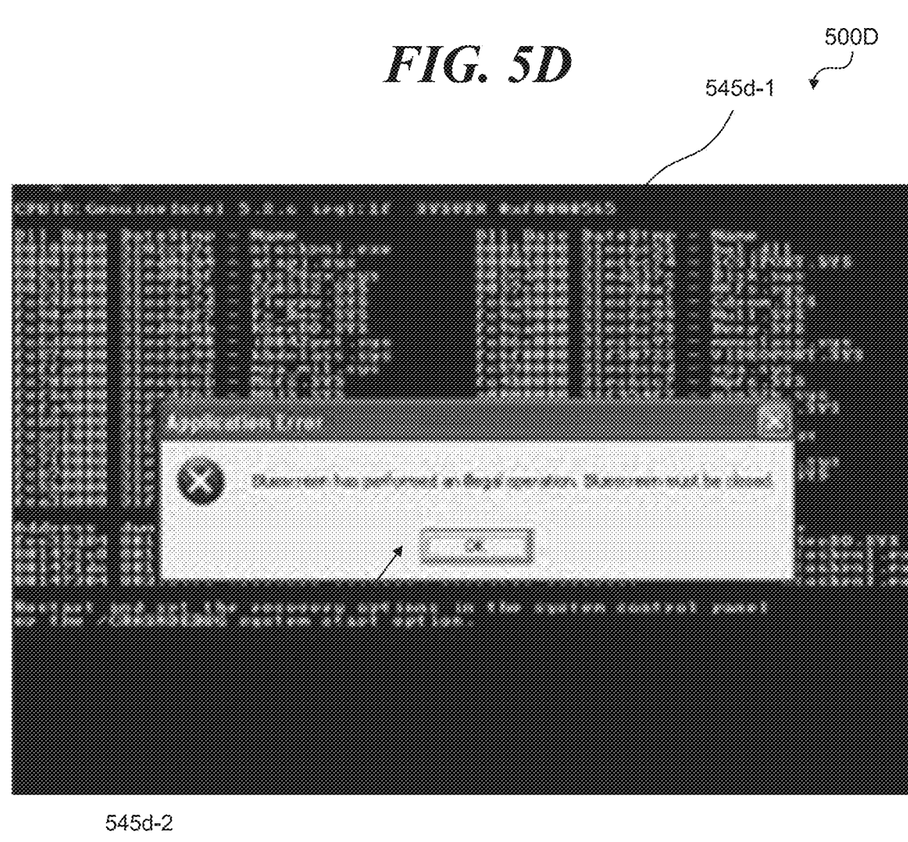
FIG. 5D is a display illustrating another exemplary embodiment of graphical data that includes graphics or graphical elements caused by an error.

FIG. 5C is a display 500C illustrating graphics data including a blue error screen that is output by the agentless system. FIG. 5D is a display 500D illustrating graphics data include a blue error screen and error dialog that are output by an agentless system. In some embodiments, the blue error screen is caused to be displayed as a result of a system crash or fatal system error. For example, a blue screen error can be displayed when an operating system reaches a condition where it can no longer safely operate. The displays 500C and 500D are therefore the actual output graphics shown by a display device.

In some embodiments described herein, detecting and addressing error is described in examples in which the actual output graphics include at least a portion of the graphics or content intended to be displayed. Nonetheless, it should be understood that the embodiments described herein can also be applied to examples in which the actual output graphics do not include any of the intended data, such as those illustrated in FIG. 5C in which the entire display is a blue error screen 545c-1, or in FIG. 5D in which the entire display is made up of a blue error screen 545d-1 and an additional error dialog 545d-2.

In some embodiments, the display of a blue screen error causes the system to record information about the error and, in turn, to reboot. However, in some cases, the system may not reboot, for example, due to an additional error dialog being displayed. The remedial actions described herein can include a management controller addressing the error dialog 545d-2 and/or rebooting the system, which as described above can be performed by the management controller independent of the state of the system processor, system memory, and/or its operating system and applications.

Various embodiments described herein may be implemented at least in part in any conventional computer programming language. For example, some embodiments may be implemented in a procedural programming language (e.g., "C"), or in an object oriented programming language (e.g., "C++"). Other embodiments may be implemented as a pre-configured, stand-alone hardware element and/or as preprogrammed hardware elements (e.g., application specific integrated circuits, FPGAs, and digital signal processors), or other related components.

In an alternative embodiment, the disclosed systems and methods may be implemented as a computer program product for use with a computer system. Such implementation may include a series of computer instructions fixed either on a tangible, non-transitory medium, such as a computer readable medium (e.g., a diskette, CD-ROM, ROM, or fixed disk). The series of computer instructions can embody all or part of the functionality previously described herein with respect to the system.

Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies.

Among other ways, such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). In fact, some embodiments may be implemented in a software-as-a-service model ("SAAS") or cloud computing model. Of course, some embodiments may be implemented as a combination of both software (e.g., a computer program product) and hardware. Still other embodiments of the invention are implemented as entirely hardware, or entirely software.'

Aspects of the present system and method are described herein with reference to sequence diagrams and/or block diagrams of methods, apparatuses and computer program products according to examples of the principles described herein. Each sequence or block of the diagrams, and combinations of sequences and blocks in the diagrams, may be implemented by computer usable program code. The computer usable program code may be provided to a processor of a general purpose computer, special purpose computer, or other programmable data processing apparatus to produce a machine, such that the computer usable program code, when executed via, for example, a system processor (e.g., FIG. 1, processor 104) or other programmable data processing apparatus, implement the functions or acts specified in the sequences and/or blocks of the diagrams. In one example, the computer usable program code may be embodied within a computer readable storage medium; the computer readable storage medium being part of the computer program product. In one example, the computer readable storage medium is a non-transitory computer readable medium.

The preceding description has been presented to illustrate and describe examples of the principles described. This description is not intended to be exhaustive or to limit these principles to any precise form disclosed. Many modifications and variations are possible in light of the above teaching.

The invention claimed is:

1. A management processor, comprising:
a processing core; and
at least one memory communicatively coupled to the processing core, the at least one memory storing management firmware which when executed by the processing core cause the processor to:
obtain first graphic data corresponding to actual output graphics displayed via a connected display device at a first instance;
detect an error in the actual output graphics based on the received first graphic data, the error indicating one or more differences between the actual output graphics displayed at the first time instance and corresponding intended output graphics; and
address the detected error,
wherein the addressing the detected error includes remedying or attempting to remedy the detected error by eliminating the one or more differences,
wherein the intended output graphics include a first set of graphical elements and the actual output graphics include a second set of graphical elements,
wherein the second set of graphical elements includes at least one graphical element that (i) is not included in the first set of graphical elements, (ii) corresponds to the one or more differences associated with the detected error, and (iii) is displayed such that it at least partially obstructs the display of others of the second set of graphical elements that are also included in the first set of graphical elements.

2. The management processor of claim 1, wherein the obstruction of the display of the others of the second set of graphical elements includes interfering with the ability to view the others of the second set of graphical elements at the display device.

3. The management processor of claim 1, wherein the one or more differences are based on image properties of the actual output graphics relative to the intended output graphics.

4. The management processor of claim 1, wherein the at least one graphical element includes a dialog identified based on properties thereof including one or more of size, shape, color and location.

5. The management processor of claim 1, wherein the eliminating the one or more differences results in the actual output graphics matching or adhering to the corresponding intended output graphics.

6. The management processor of claim 1,
wherein the eliminating the one or more differences results in actual output graphics displayed at a second time instance matching or adhering to corresponding intended output graphics, and
wherein the second time instance is subsequent to the first time instance.

7. The management processor of claim 4, wherein the addressing the detected error includes:
identifying, by the management processor, one or more input and/or output elements of the identified dialog, the one or more input and/or output elements including one or a combination of text and control elements including a button; and
executing, by the management processor, one or more remedial actions based on the identified one or more input and/or output elements, to eliminate the one or more differences.

8. The management processor of claim 7, wherein the one or more remedial actions include simulating, by the processing core, an input device event without being triggered by a peripheral device.

9. The management processor of claim 8,
wherein the at least one memory further stores graphics output templates including sets of intended output graphics indicating expected or known error-free graphics outputs, and
wherein the intended output graphics corresponding to the actual output graphics displayed at the first time instance are selected from the graphics output templates.

10. The management processor of claim 9,
wherein the at least one memory further stores error templates corresponding to respective errors, each of the error templates including respective error details and error remedies, and
wherein the error in the actual output graphics is detected and addressed based on the corresponding error template.

11. The management processor of claim 1, wherein the management processor is included in an agentless system, wherein the agentless system further comprises:
a system processor; and
a system memory communicatively coupled to the system processor, the system memory storing an operating system executable by the system processor,
wherein the detection of the error and the addressing of the error are performed by the management processor independent of the operating state of the system processor.

12. The management processor of claim 11, wherein the error in the actual output graphics is caused by the execution of the operating system.

13. A system comprising:
a system processor;
a system memory storing one or more applications including executable instructions, which when executed by the system processor cause the system processor to output graphic data;
a management controller including a management processor and a management memory storing management firmware, which when executed by the management processor causes the management processor to:
receive the graphic data caused to be output by the execution of the one or more applications stored in the system memory;
cause to display, via a video controller, the graphic data at a connected display device;
detect an error in the displayed graphic data, the error indicating the presence of an extraneous graphic among the displayed graphic data relative to corresponding intended output graphics;
address the detected error by executing one or more actions on the displayed graphic data, such that the extraneous graphic is removed from the displayed graphic data,
wherein intended output graphics include a first set of graphical elements and the actual output graphics include a second set of graphical elements,
wherein the second set of graphical elements includes at least one graphical element that (i) is not included in the first set of graphical elements, (ii) corresponds to the one or more differences associated with the detected error, and (iii) is displayed such that it at least partially obstructs the display of others of the second set of graphical elements that are also included in the first set of graphical elements.

14. The system of claim 13, wherein the video controller is included in the management controller.

15. The system of claim 13,
wherein the management memory stores expected graphic data, and,
wherein the extraneous graphic is detected based on a comparison of the displayed graphic data with expected graphic data.

16. The system of claim 13, wherein the executing the management firmware further causes the management processor to identify one or more graphic control elements in the extraneous graphic,
wherein the one or more actions are executed based on (1) one or more of the identified graphic control elements, or (2) predetermined rules selected based on graphic characteristics of the extraneous graphic and the displayed graphic data.

17. A method, comprising:
executing, by a system processor, one or more applications, causing corresponding graphic data to be generated for display;
causing, by a management controller separate from the system processor, to display at a display device, the generated graphic data;
detecting, by the management controller, an error in the graphic data as displayed at the display device, the error indicating an extraneous graphic in the displayed graphic data, the extraneous graphic obstructing the visibility of the graphic data at the display device;
identifying, by the management controller, features of the extraneous graphic; and
executing, by the management controller, one or more actions based on the identified features of the extraneous graphic,
wherein the executing of the one or more actions causes the extraneous graphic to be removed such that it does not obstruct the visibility of the image data at the display device.

18. The method of claim 17, wherein the detecting of the error or the identifying of the features of the extraneous graphic indicated by the error are based on pixel data of the graphic data as displayed at the display device.

* * * * *